Jan. 27, 1953    L. E. HARPER    2,626,728
PROPORTIONING DEVICE

Original Filed Feb. 21, 1947    4 Sheets—Sheet 1

INVENTOR.
LYNDUS E. HARPER
BY
Alfred R. Fuchs
ATTORNEY

Jan. 27, 1953 L. E. HARPER 2,626,728
PROPORTIONING DEVICE
Original Filed Feb. 21, 1947 4 Sheets-Sheet 2

INVENTOR.
LYNDUS E. HARPER
BY
Alfred R. Fuchs
ATTORNEY

Jan. 27, 1953　　　L. E. HARPER　　　2,626,728
PROPORTIONING DEVICE
Original Filed Feb. 21, 1947　　　4 Sheets-Sheet 3

INVENTOR.
LYNDUS E. HARPER
BY
Alfred R. Fuchs
ATTORNEY

Jan. 27, 1953 L. E. HARPER 2,626,728
PROPORTIONING DEVICE
Original Filed Feb. 21, 1947 4 Sheets-Sheet 4

INVENTOR.
LYNDUS E. HARPER
BY
Alfred R. Fuchs
ATTORNEY

Patented Jan. 27, 1953

2,626,728

UNITED STATES PATENT OFFICE 2,626,728

PROPORTIONING DEVICE

Lyndus E. Harper, Chicago, Ill., assignor to Omega Machine Company, Providence, R. I., a corporation of Missouri Original application February 21, 1947, Serial No. 730,162. Divided and this application July 1, 1949, Serial No. 102,549

13 Claims. (Cl. 222—57)

1

My invention relates to proportioning devices, and more particularly to a device for continuously accurately proportioning two materials relative to each other, including means that positively controls the flow of one material at a desired rate and means for causing the flow of another material to automatically follow in correct proportion. This is a division of my application Serial No. 730,162, filed February 21, 1947, on Proportioning Device.

My invention relates to proportioning devices particularly adapted for proportioning a solid material and a liquid to each other, but which can also be used for proportioning a liquid to another liquid. My invention is particularly adapted to control the operation of a valve by controlling means involving a differential mechanism which is operated by the combined action of a member actuated by a feeder and a member actuated by a liquid metering device.

While the invention disclosed herein operates a valve by controlling means operated by variations in air pressure, said controlling means may also be operated in other ways, and while the feeder is, preferably, a feeder for dry material, my invention is also adaptable for use in connection with certain feeders for liquid material.

More particularly my invention is adapted for controlling the flow of a liquid through the positioning of a valve in proportion to the feeding of a solid material or a liquid that is fed by suitable rotary feeding means. The rotary feeding means, whether for feeding dry material or a liquid, is capable of being adjusted for feeding at various rates. The adjustment of the feeding means of either the solid or the liquid material may be either automatic or manual, and in either the case of the liquid or dry material feeding means, the rate of feed of the liquid or dry material controls the position of the valve that controls the supply of liquid.

Other objects and advantages of my invention will appear as the description of the drawings proceeds. I desire to have it understood, however, that I do not intend to limit myself to the particular details shown or described, except as defined in the claims.

2 to the flow of another liquid supplied by rotary feeding means.

Figure 1:
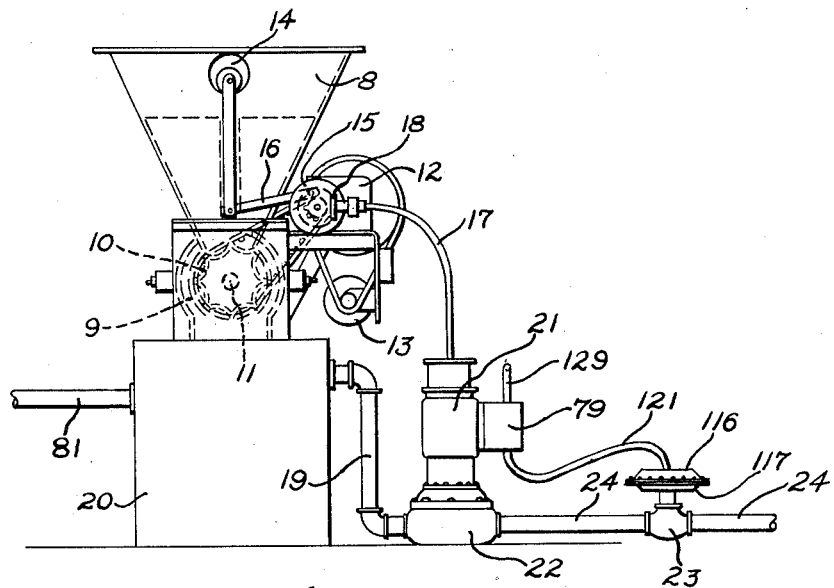
Fig. 1 is a side elevational view, partly broken away, of my improved controlling means for controlling the flow of a liquid in proportion to the feed of a solid or dry material by a rotary feeding means.
Figure 3:
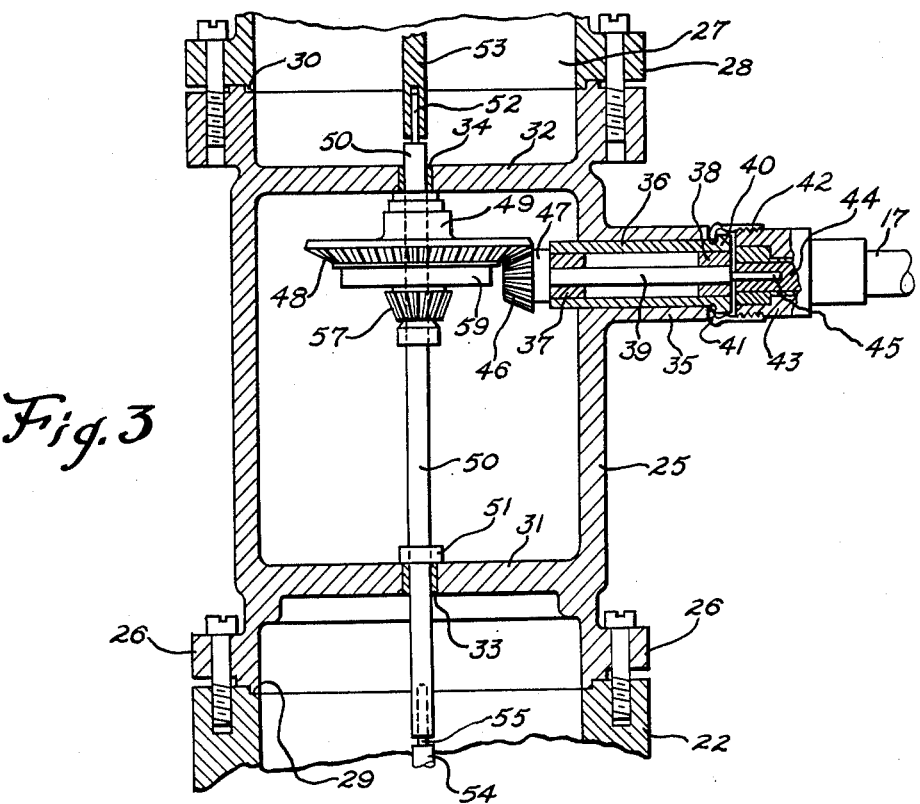

Fig. 3 is a vertical sectional view on an enlarged scale of the differential mechanism employed in the form of the invention shown in Fig. 1.

Figure 4:
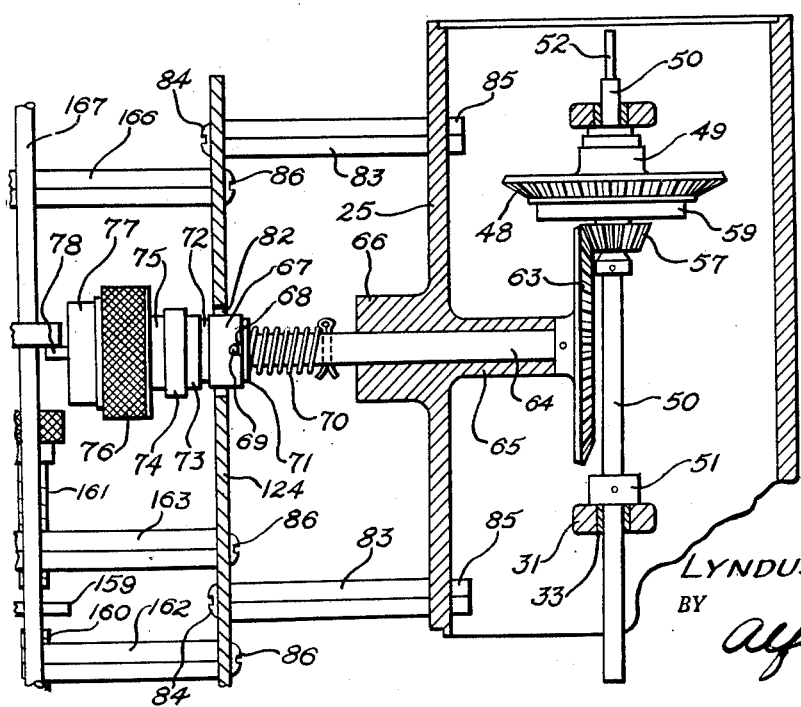

Fig. 4 is a vertical sectional view taken at right angles to Fig. 3, partly broken away.

Figure 5:
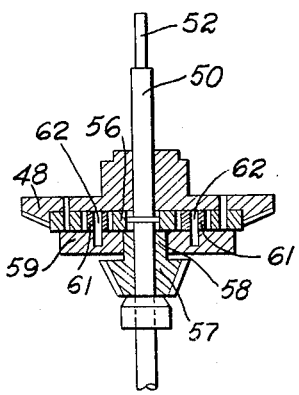

Fig. 5 is a detail sectional view through the differential drive mechanism employed in the form of the invention shown in Figs. 3 and 4.

Figures 6, 7:
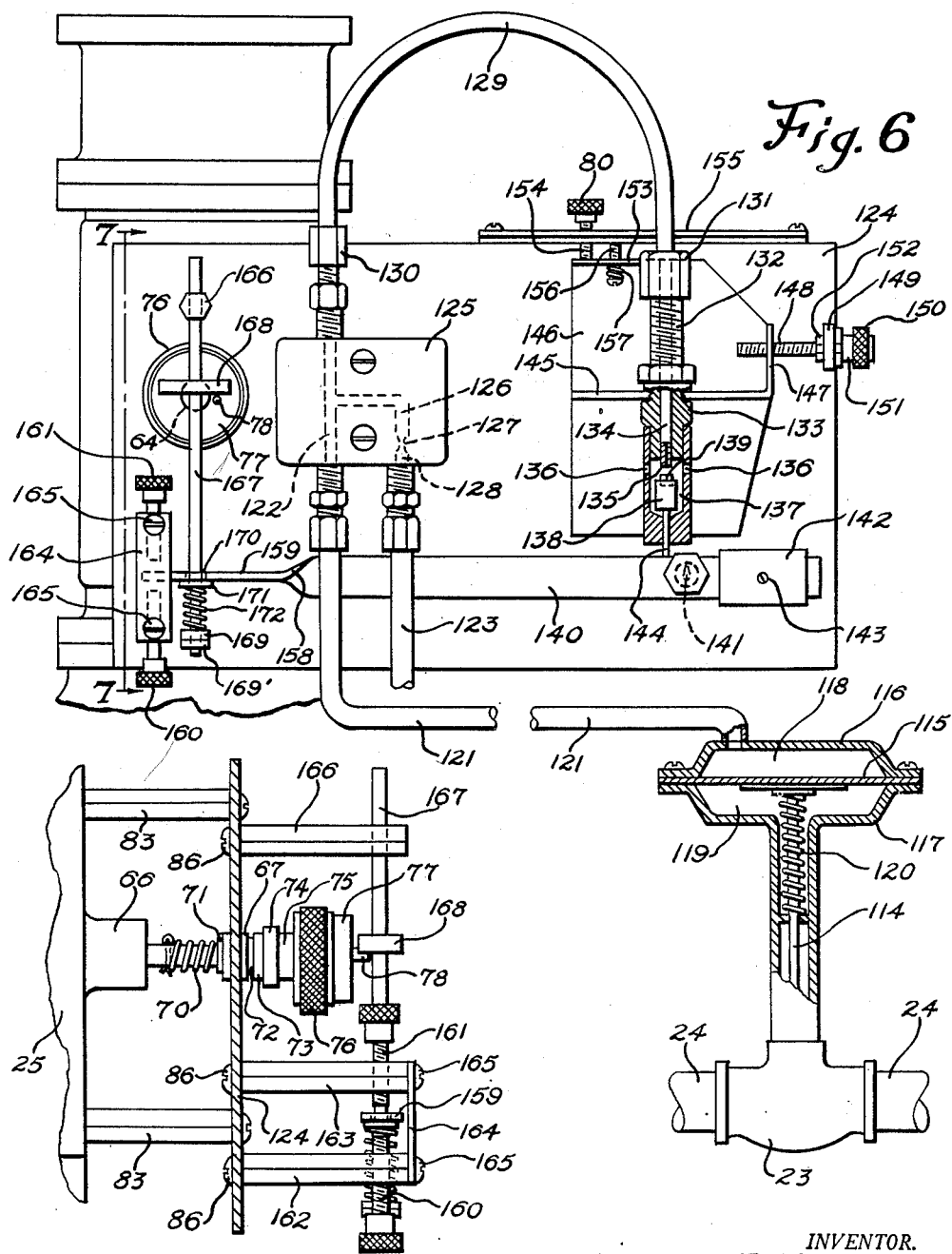

Fig. 6 is a view partly in elevation and partly in section of the air pressure operated means for controlling the valve, and Fig. 7 is a view partly in elevation and partly in section, taken on the line 7—7 of Fig. 6, partly broken away.

Referring in detail to the drawings, in Fig. 1 is shown dry material feeding means having a hopper 8, which is provided with an opening in the bottom thereof that leads to a partly circular chamber 9, in which a rotary feeding member 10 for dry material is provided. The rotary feeding member is mounted on a shaft 11, which is driven from a variable speed drive 12, said variable speed drive being interposed between the motor 13 and said rotary feeding member 10. Thus the rate of feed of the dry material by the feeding member 10 will be proportional to the speed of the output shaft of the variable speed drive 12. Suitable agitating means 14 driven through a drive mechanism including the crank disk 15 and the link 16 pivotally connected with a depending arm on said agitating means keeps the contents of the hopper agitated so as to prevent bridging over thereof and assuring a continuous feed to the rotary member 10, the agitating means not being a part of this invention.

The output shaft of the variable speed drive is connected with a flexible shaft 17 through an adjustable driving connection 18 for adjusting the predetermined ratio of dry material fed by the member 10 to the liquid supplied through liquid supply pipe 19 to the chamber 20. The flexible shaft 17 extends to the controlling device 21 mounted on a water meter 22, through which the water passes to the pipe 19, said water passing through a valve 23 interposed in a supply line 24 that leads to the water meter 22.

The controlling device is shown more in detail in Figs. 3 to 6, inclusive, the same comprising a main housing 25, which is mounted on the water meter 22 in a suitable manner, ears 26 being shown as being provided for bolting the housing 25 to the water meter body 22. The water meter ordinarily is provided with a removable upper housing portion 27, in which the counting mechanism is located, and it will be noted upon reference to Fig. 3 that the housing 27 is provided with ears 28 for securing the same to the housing 25 in the same manner as it would have been secured to the water meter had the housing 25 not been interposed, the housing 25 having a downwardly extending flange portion 29, which seats in a suitable groove in the meter body 22 and the counting mechanism housing portion 27 having a similar depending flange 30 that seats in a groove in the upper end of the body portion 25. Said body portion also has a pair of transversely extending webs 31 and 32, which are provided with bearings 33 and 34 for a purpose to be described below.

The housing also has an outwardly extending tubular projection 35, in which a sleeve 36 is mounted, which is provided with the bearings 37 and 38 for a shaft 39. The sleeve has an annular enlargement 40 thereon between which and the end portion of the tubular projection 35 is mounted the hook flange 41 on the internally threaded sleeve 42, with which the threaded coupling member 43 engages to connect the shaft portion 44 on the flexible shaft member 17 with the reduced end portion 45 of the shaft 39, so that the shafts 17 and 39 will turn in unison.

A bevel gear 46 is fixed on the shaft 39 and spaced from the inner end of the tubular member 36 by a collar 47. Said bevel gear meshes with a large bevel ring gear 48, which has a hub portion 49 which is free to rotate on the shaft 50, which is mounted in the bearing 34. The shaft 50 is also mounted in the bearing 33, a collar 51 being pinned to the shaft 50 to hold the same in proper position so that the reduced end portion 52 thereof will engage with the shaft 53 of the counting mechanism. Said shaft 50 is driven by the meter shaft 54 through a coupling at 55.

A gear 56 is fixed on the shaft 50 and a bevel gear 57 is free to rotate on the shaft 50, said bevel gear 57 having a reduced extension 58 on its hub, on which the disk 59 is fixed. A ring gear 60 is fixed to the bevel gear 48 and pinions 61 that are rotatably mounted on the disk 59 on the shafts 62 mesh with the internal teeth on the ring gear 60 and with the external teeth on the gear 56. The bevel gear 57 meshes with a large bevel gear 63, which is fixed on the shaft 64, said shaft 64 being mounted in a tubular bearing portion 65 projecting inwardly, and an enlarged tubular portion 66 projecting outwardly from the housing 25.

The disk 59 will remain stationary when the shaft 50 and the shaft 39 are rotating at the desired speed ratio, this being determined by the sizes of the various gears provided in the differential gearing and the bevel gearing above described. If the speed of the shaft 39 increases relative to the speed of the shaft 50 above that desired, then the disk-like member 59 will be rotated in one direction due to the rotation of the pinions 61 around the shaft 50, while if the speed of the shaft 50 is too great relative to that of the shaft 39, then the disk-like member 59 will be rotated in the opposite direction. This will cause rotation of the shaft in either one or the other direction, dependent upon the relative speed of the shafts 39 and 50.

The shaft 64 has a clutch member 67 rotatably mounted thereon, which has a pair of notches 68 therein, in which the pin 69 extending through the shaft 64 is adapted to engage normally, being held in engagement therewith by the compression spring 70 bearing against the cotter pin extending through the shaft and the disk 71, which engages with said clutch member, and which holds said clutch member in frictional engagement with a friction washer 72 interposed between the clutch member 67 and the forwardly projecting hub 73 on the collar 74, which is rotatable on the shaft 64 but held against movement axially thereof. Said collar is fixed on the projecting hub portion 75 on the knurled knob 76 and the disk 77 is fixed on said knob 76. The disk 77 has a pin 78 projecting eccentrically therefrom for a purpose to be described below.

The means for controlling the position of the valve 23 includes in addition to the differential means above described air operated means, shown in Figs. 6 and 7, controlled by the position of the pin 78. The valve 23 has a stem 114, which is connected with the diaphragm 115 that is clamped between the members 116 and 117 at its edges, thus dividing the space between the members 116 and 117 into two chambers 118 and 119. Resilient means, such as the coil spring 120, tends to move the valve member provided in the member 23 in one direction, which in the form of the invention shown in Fig. 6 is in a seating direction, and movement of the diaphragm 115 by increase of pressure in the chamber 118 causes the valve to move in the opposite or in an opening direction.

The chamber 118 has a conduit 121 connected therewith, which is connected with a passage 122 in the block 125 mounted on the mounting plate 124, which may be part of a housing 79. The block 125 has a passage 126 extending from the passage 122 which is connected with a passage 128 by means of a restriction or restricted orifice 127. The passage 128 is connected with a source of constant air pressure by means of the pipe 123.

Means for varying the pressure in the pipe 121 is provided comprising a pipe 129 connected with the passage 122 through a suitable screw-threaded coupling 130. The pipe 129 has a coupling 131 at the opposite end thereof, which is connected with a screw-threaded member 132 that connects it with a valve body 133.

Said valve body 133 has a passage 134 therein that has a tubular member 135 mounted in the end thereof and projecting slightly beyond the end of said passage to provide a reduced portion in said passage. Said valve body further has side openings 136 to the atmosphere and has a chamber 137 therein, into which said openings lead, that communicates with the tubular member 135. A valve member 138 is mounted in the chamber 137 and has a projecting portion 139 thereon that is adapted to engage the end of the passage in the member 135 or to assume suitable positions in spaced relation thereto, to vary the amount of air passing through the member 135 and thus through the tube 129, and out through the openings 136. The opening to atmosphere provided through the member 135 is of greater size than the restriction 127. It will be obvious that the less air that can discharge through the tube 129 the greater will be the effective pressure in the chamber 118 and the further will the diaphragm 115 move in opposition to the pressure of the spring 120.

A lever 140 is mounted on a knife edge fulcrum 141 provided on the plate 124 and an adjustable counterweight 142 is provided on said lever 140, the same being longitudinally slidable on the lever 140 and being adapted to be clamped in position by means of a set screw 143. The position of the lever 140 will determine the position of the valve 138, as said valve has a projecting pin or stem portion 144 that engages said lever. The sensitivity of the valve mechanism is determined by the spacing of the point of contact of the pin 144 with the lever relative to the fulcrum 141 and means is provided for adjusting the position of said pin 144 relative to the fulcrum.

The tubular member 129 is flexible so that the curvature thereof can be varied to permit such adjustment. In order that such adjustment can be accomplished the valve body 133 is mounted on a flange 145 of a plate 146, which also has a flange 147 thereon that has a threaded opening therein, with which the screw-threaded member 148 engages, which is rotatable in an ear 149 provided on the plate 124, adustment thereof being obtained by means of a knurled knob 150 fixed thereto, between which and said ear a spacing nut 151 is provided, the member 148 being held against longitudinal movement relative to the ear 149 by means of the nut 151 and the nut 152, the nut 151 also serving to lock the parts in adjusted position. The plate 146 is also provided with a flange 153, with which the end of a screw-threaded member 154 having a knurled head 80 engages, that screw-threadedly engages in an opening in the bar 155 mounted on the plate 124 to provide for vertical adjustment of the valve body relative to the lever, said adjusting means also including a screw-threaded member 156 which engages with a screw-threaded opening in the bar 155, and which has a coil spring 157 mounted between the head thereof and the member 153.

The lever 140 is twisted at 158 to turn the portion 159 thereof into a plane at right angles to the body portion 140, the portion 159 of the lever 140 being mounted between a pair of stop screws 160 and 161, which are adjustably mounted in posts 162 and 163 extending from the plate 124 and which are connected together by means of a bar 164 by means of screw-threaded headed members 165. A post 166 also extends from the plate 124 and has a guide opening therein for the rod 167. Said rod 167 has a collar 168 thereon, which is fixed in position, and said rod has a screw-threaded lower end upon which the nut 169 is threaded. The lever 159 is provided with an opening 170 therein that is larger than said rod, and a washer 171 is mounted on said rod, a coiled compression spring 172 being provided between the washer 171 and the nut 169. The compression of the spring 172 can be adjusted by means of the nut 169 so that this will overcome the weight of the valve 138 and any movement of the rod 167 will be transmitted to the lever 140 to thus move the valve stem or pin 144 in response to the position of said lever 140. A lock nut 169' is provided to hold the parts in adjusted position.

By providing the yielding connection between the rod-like member 167 and the lever 140, any damage to the mechanism for moving the rod 167 will be avoided, should such movement of the rod 167 cause the end of the portion 159 of the lever to engage one of the stop members 160 or 161. The position of the rod 167 is determined by means of the pin 78, which engages the collar 168, and the spring 172 also serves to hold the collar 168 constantly in engagement with said pin.

It will be obvious that rotation of the member 77 in a counter-clockwise direction as viewed in Fig. 6 will raise the member 168 and thus the rod-like member, and the lever 140 will rise so as to cause the valve member 138 to approach the member 135 reducing the size of the bleed opening and thus increasing the pressure in the chamber 118, causing the valve on the stem 114 to be opened further against the action of the spring 120, thus increasing the flow of the liquid passing through the valve 23. Rotation of the member 77 in a clockwise direction will cause the opposite movement of the lever 140 and a movement of the valve 23 in a direction to close the same further.

The position of the member 77 is determined by the differential mechanism above described. The frictional driving connection permits the rotation of the knurled knob 76 and thus of the member 77 to locate the pin 78 in a suitable starting position to get the desired proportioning of the dry material to the liquid. After such adjustment has been made of the position of the pin 78, then it will remain in this adjusted position as long as the shafts 17 and 50 are rotated at rates that have the desired relative proportion to each other. If the speed of the shaft 17 increases relative to the speed of the shaft 50 above that to maintain this proportion, then the differential mechanism will cause the rotation of the shaft 64 in a direction to cause a counter-clockwise rotation of the disk 77, as viewed in Fig. 6, raising the member 168 and the rod-like member 167, which will increase the flow of liquid passing through the valve 23 in the manner above described. However, if the shaft 17 rotates at a rate that is less than that desired to maintain the proportion of the material fed by the rotary feeding means 10 to the amount of liquid fed to the receptacle 20 through the valve 23, then the differential mechanism will rotate the shaft 64 so as to cause a clock-wise rotation of the member 77 and the lever 140 will be moved in the opposite direction to cause the valve 23 to close further and thus adjust the rate of flow of liquid through the valve 23 to the rate of feed of dry material to the proportion desired.

By such adjustments through the differential mechanism the valve 23 will be adjusted to maintain the desired proportion of liquid to dry material until a balanced condition is achieved and there will be no movement of the shaft 64 through the differential controlling means until for some reason there is a change in proportions of the liquid and dry material being fed to the receptacle 20, whereupon the adjustment of the valve 23 in proper position to restore the proper proportion will take place in the manner above described. Thus any variation in the flow of the liquid will cause adjustment of the valve 23 by means of the differential mechanism and the air controlled means and any variations in the flow of the dry material will also cause such adjustment of the valve by said air controlled means to maintain the above referred to desired proportions between the liquid and dry material fed to said chamber. As a result the solution or suspension flowing from the discharge pipe 81 will be maintained constant in character. The variations in the supply of dry material may be either controlled by the automatic means comprising the variable speed device above referred to or manually, but no matter how it is controlled the amount of liquid which flows through the meter serves as one of the means for maintaining the rate of flow through the valve 23 at the proper value to maintain the desired proportion between the dry material and the liquid that is fed to the tank or container 20.

The plate 124, which may be a part of the housing 79, has an opening 82 therein, through which the clutch member 67 extends, and is mounted on the main housing 25 in any suitable manner, such as by means of rod-like members 83, which may have bores extending lengthwise thereof, through which screw-threaded headed fastening elements 84 extend, which are provided with nuts 85 for clamping the same in position on the housing 25. The posts 162, 163 and 166 are secured to the plate 124 in any suitable manner, as by means of screw-threaded headed fastening elements 86.

Instead of feeding a dry material and liquid in a predetermined proportion to each other and controlling the proportions of these materials to each other by such a differential controlling means as above described, the proportion of two liquids to each other can be similarly controlled, the flow of the liquid through the water meter and the liquid feed by a suitable liquid feed device being maintained in a definite proportion to each other by the proportional controlling means forming part of this invention.

Figure 2:
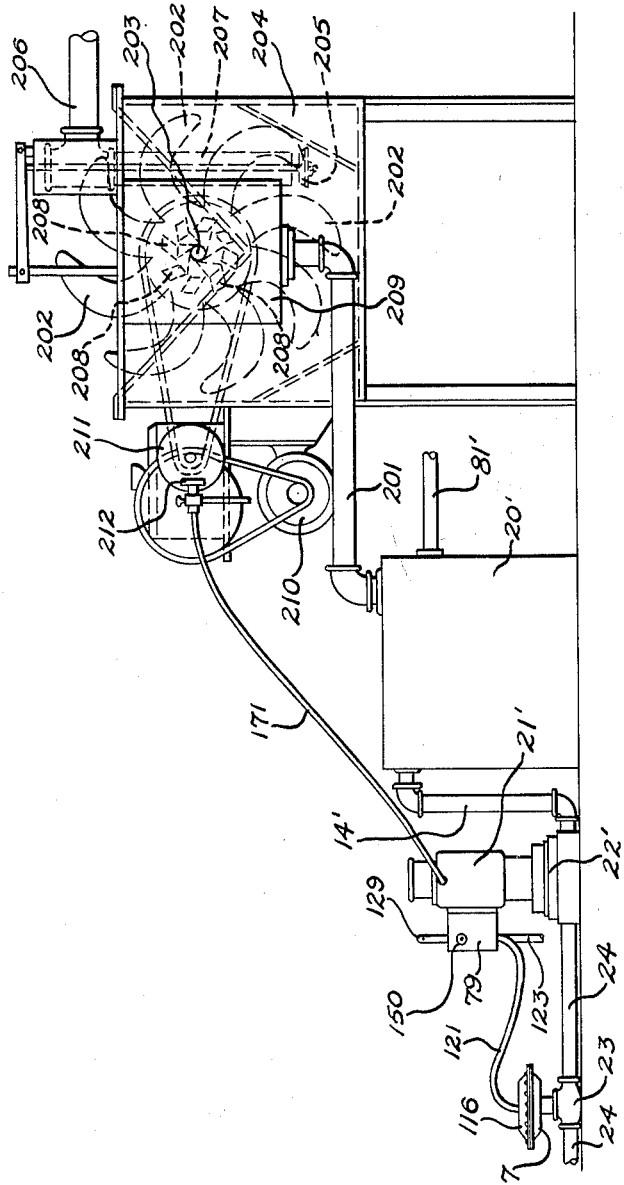
Fig. 2 is a view similar to Fig. 1, showing my improved means for controlling the position of a valve controlling the flow of a liquid relative

Such an apparatus is illustrated in Fig. 2, in which the chamber 20' has a liquid supply pipe 14' leading into the same and a liquid supply conduit 201 also leading into the same. Liquid is supplied at a desired rate to the chamber 20' through the conduit 201 by means of a rotary liquid feeding member having the buckets 202, which are mounted to rotate with the shaft 203 and which dip into a body of liquid in a tank 204, the level of which is controlled by a suitable float valve 205, the liquid being supplied to said tank 204 through a pipe 206, which leads to a pipe 207, the outlet of which is controlled by said float valve. The buckets 202 empty into discharge members or lips 208, which are located externally of the tank 204 in a chamber 209 so that when the buckets 202 pass to the upper side of the spider-like member, formed thereby, during their rotation, the liquid will flow toward the shaft 203 into the discharge members 208, which discharge their contents into the chamber 209 from which the contents of the discharge members 208 pass into the conduit 201 and into the chamber 20'.

The rotatable liquid feeding member made up of the buckets 202 and discharge members 208 is rotated by means of the motor 210 through a variable speed drive 211, the speed of which may be controlled manually or in any other suitable manner, the output shaft of the variable speed drive 211 driving the shaft 203 of the rotatable liquid feeding member, and the flexible shaft 17' being connected with said output shaft of the variable speed drive device 211, through an adjustable driving connection 212, whereby the ratio of feed of liquids through pipes 14' and 201 may be adjusted. The shaft 17' is connected with the differential controlling device in the same manner as the shaft 17, the controlling device 21' being mounted on the water meter 22' in the same manner as the controlling device 21 previously described and operating in the same manner.

The controlling means for the valve 23 provided in the liquid conduit 24 is the same as that previously described comprising the differential mechanism shown in Figs. 3 and 4 and the air actuated controlling means for said valve shown in Figs. 6 and 7, the same reference numerals being applied to the corresponding parts in Fig. 2 as in Fig. 1. The discharge of the resulting product from the mixture of the two liquids in the chamber 20' is through the discharge pipe 81' corresponding to the discharge pipe 81 previously described.

The operation of the device shown in Fig. 2 is analogous to that of the device shown in Fig. 1, in that any change in the rate of feed of the liquid coming from the pipe 206 through the rotary feeding member, through the conduit 201, to the chamber 20' due to change in speed of the variable speed device 211 will correspondingly change the speed of the flexible shaft 17' and adjust the differential control device to adjust the valve 23 so that the same proportion of liquid passing through the pipe 14' relative to that passing through the conduit 201 into the chamber 20' will be maintained as was the case prior to the change in speed of the variable speed device 211. Similarly any change in rate of flow through the water meter 22' will adjust the variable speed device so as to adjust the valve 23 to maintain the proper proportion between the liquid supply through the pipe 14' and the conduit 201.

In both forms of the invention the adjustment of the proportions can be varied by adjusting the variable speed driving connection between the flexible shaft 17 or 17' and the output shaft of the variable speed drive, or by the manual controlling means 76, as the case may be.

What I claim is:

1. The combination with a receptacle, of means for feeding material to said receptacle at a variable rate comprising a rotatable feeding member, means for rotating said feeding member at a variable rate, said feeding member feeding said material at a rate proportional to its rate of rotation, means for supplying a liquid to said receptacle comprising a conduit leading to said receptacle, a valve controlling the flow of liquid through said conduit, and means controlling the position of said valve to maintain a predetermined proportion between said material and said liquid comprising a member rotating with said feeding member, a member rotated by the liquid passing through said conduit to rotate at a rate proportional to the rate of flow of liquid therethrough, differential means connecting said last mentioned members and a valve positioning member actuated by said differential means.

2. The combination with a receptacle, of rotatable means for feeding a material to said receptacle, means for varying the rate of feed of said material comprising means for varying the rate of rotation of said rotatable feeding means, means for supplying a liquid to said receptacle comprising a conduit leading to said receptacle, a valve controlling the flow of liquid through said conduit, and means controlling the position of said valve to maintain a predetermined proportion between said material and said liquid comprising a member rotating with said feeding means proportional to the rate of feed thereof, a member rotated independently of the member rotating with said feeding means by the liquid passing through said conduit to rotate at a rate proportional to the rate of flow of liquid therethrough, differential means connecting said last mentioned members and a positioning member for said valve actuated by said differential means.

3. The combination with a receptacle, of means for feeding a material to said receptacle at a variable rate, means for supplying a liquid to said receptacle comprising a conduit leading to said receptacle, a valve controlling the flow of liquid through said conduit, and air pressure actuated means controlling the position of said valve to maintain a predetermined proportion between said material and said liquid comprising a member rotating with said feeding means proportional to the rate of feed thereof, a member rotated independently of the member rotating with said feeding means by the liquid passing through said conduit to rotate at a rate proportional to the rate of flow of liquid therethrough, differential means connecting said last mentioned members, a member adjustable to vary the air pressure acting on said controlling means actuated by said differential means, and means for adjusting said proportion interposed between said differential means and said adjustable member comprising a friction clutch.

4. The combination with a receptacle, of means for feeding a material to said receptacle comprising a rotary dry material feeding member over said receptacle discharging directly into said receptacle, means for varying the rate of rotation thereof to vary the rate of feed of said dry material into said receptacle, means for supplying a liquid to said receptacle comprising a conduit leading to said receptacle, a valve controlling the flow of liquid through said conduit, and means controlling the position of said valve to maintain a predetermined proportion between said dry material and said liquid comprising a member rotating with said rotary feeding means proportional to the rate of rotation thereof, a member rotated independently of the member rotating with said feeding means by the liquid passing through said conduit to rotate at a rate proportional to the rate of flow of liquid therethrough, differential means connecting said last mentioned members and a positioning member for said valve actuated by said differential means.

5. The combination with a receptacle, of rotary means for feeding a material to said receptacle at a variable rate, means for supplying a liquid to said receptacle comprising a conduit leading to said receptacle, a valve controlling the flow of liquid through said conduit, and air pressure actuated means controlling the position of said valve to maintain a predetermined proportion between said material and said liquid comprising a member rotating with said feeding means proportional to the rate of feed thereof, a member rotated independently of the member rotating with said feeding means by the liquid passing through said conduit to rotate at a rate proportional to the rate of flow of liquid therethrough, differential means connecting said last mentioned members, a member adjustable to vary the air pressure acting on said controlling means actuated by said differential means, and means for adjusting said proportion interposed between said differential means and said adjustable member comprising a friction clutch.

6. The combination with a receptacle, of rotary means for feeding a dry material to said receptacle at a variable rate, means for supplying a liquid to said receptacle comprising a conduit leading to said receptacle, a valve controlling the flow of liquid through said conduit, and air pressure actuated means controlling the position of said valve to maintain a predetermined proportion between said material and said liquid comprising a member rotating with said feeding means proportional to the rate of feed thereof, a member rotated by the liquid passing through said conduit to rotate at a rate proportional to the rate of flow of liquid therethrough, differential means connecting said last mentioned members and a member adjustable to vary the air pressure acting on said controlling means actuated by said differential means.

7. The combination with a receptacle, of rotary means for feeding a liquid to said receptacle at a variable rate, means for supplying a second liquid to said receptacle comprising a conduit leading to said receptacle, a valve controlling the flow of liquid through said conduit, and air pressure actuated means controlling the position of said valve to maintain a predetermined proportion between said liquids comprising a member rotating with said feeding means proportional to the rate of feed thereof, a member rotated by the liquid passing through said conduit to rotate at a rate proportional to the rate of flow of liquid therethrough, differential means connecting said last mentioned members and a member adjustable to vary the air pressure acting on said controlling means actuated by said differential means.

8. A device for maintaining a predetermined proportion between the rate of supply of a liquid and another material comprising a liquid line, a valve controlling flow through said line, a meter measuring flow through said line, a device for controlling the position of said valve comprising a differential mechanism having a part driven in proportion to the rate of supply of said material, a part independently driven by said meter, and a member movable by said differential mechanism only upon said rates of supply becoming out of said predetermined proportion, said member being movable in opposite directions, and air pressure actuated means to adjust the position of said valve, comprising a diaphragm chamber, and means for varying the pressure in said diaphragm chamber, comprising a constant pressure air supply, a bleed valve connected with said supply, and means actuated by said member movable by said differential mechanism to control the position of said bleed valve.

9. A device for maintaining a predetermined proportion between the rate of supply of a liquid and another material comprising a liquid line, a valve controlling flow through said line, a meter measuring flow through said line, a device for controlling the position of said valve comprising a differential mechanism having a part driven in proportion to the rate of supply of said material, a part driven by said meter, and a member movable by said differential mechanism only upon said rates of supply becoming out of said predetermined proportion, said member being movable in opposite directions, and air pressure actuated means to adjust the position of said valve, comprising a diaphragm chamber, and means for varying the pressure in said diaphragm chamber actuated by said member movable by said differential mechanism, comprising a conduit connecting said diaphragm chamber with a source of constant pressure having a restricted portion, a conduit leading from a bleed opening to a point between said chamber and restricted portion and means for adjusting the effective size of said bleed opening actuated by the member movable in opposite directions.

10. A device for maintaining a predetermined proportion between the rate of supply of a liquid and another material comprising a liquid line, a valve controlling flow through said line, a meter measuring flow through said line, a device for controlling the position of said valve comprising a differential mechanism having a part driven in proportion to the rate of supply of said material, a part driven by said meter, and a member movable by said differential mechanism only upon said rates of supply becoming out of said predetermined proportion, said member being movable in opposite directions, and air pressure actuated means to adjust the position of said valve, comprising a diaphragm chamber, and means for varying the pressure in said diaphragm chamber actuated by said member movable by said differential mechanism, comprising a conduit connecting said diaphragm chamber with a source of constant pressure having a restricted portion, a conduit leading from a bleed opening to a point between said chamber and said restricted portion, and means for adjusting the effective size of said bleed opening comprising a valve member, a lever engaging said valve member to hold the same in adjusted position, and means for adjusting the position of said lever actuated by the member movable in opposite directions.

11. A device for maintaining a predetermined proportion between the rate of supply of a liquid and another material comprising a liquid line, a valve controlling flow through said line, a meter measuring flow through said line, a device for controlling the position of said valve comprising a differential mechanism having a part driven in proportion to the rate of supply of said material, a part driven by said meter, and a member movable by said differential mechanism only upon said rates of supply becoming out of said predetermined proportion, said member being movable in opposite directions, and air pressure actuated means to adjust the position of said valve, comprising a diaphragm chamber, and means for varying the pressure in said diaphragm chamber actuated by said member movable by said differential mechanism, comprising a fluid conduit connected with said diaphragm chamber having a bleed opening, and means for adjusting the effective size of said bleed opening comprising a valve member, a lever engaging said valve member to hold said valve member in adjusted position, and means for adjusting the position of said lever, comprising a rod connected with said lever to determine the position thereof, and means for adjusting the position of said rod comprising a lateral projection on said rod and means engaging said projection actuated by the member movable in opposite directions.

12. The combination with a receptacle, of rotary means for feeding a material to said receptacle, means for varying the rate of feed of said material, means for supplying a liquid to said receptacle comprising a conduit leading to said receptacle, a valve controlling the flow of liquid through said conduit, and means controlling the position of said valve to maintain a predetermined proportion between said material and said liquid comprising a member rotating with said feeding means proportional to the rate of feed thereof, a member rotated by the liquid passing through said conduit to rotate at a rate proportional to the rate of flow of liquid therethrough, differential means connecting said last mentioned members and a valve positioning member actuated by said differential means, including a friction clutch device between said valve positioning member and said differential means, and means for manually adjusting said friction clutch device to adjust said controlling means independently of said differential mechanism.

13. A device for maintaining a predetermined proportion between the rate of supply of a liquid and another material comprising a liquid line, a valve controlling flow through said line, a meter measuring flow through said line, a device for controlling the position of said valve comprising a differential mechanism having a part driven in proportion to the rate of supply of said material, a part driven by said meter, and a member movable by said differential mechanism only upon said rates of supply becoming out of said predetermined proportions, said member being movable in oppposite directions, and air pressure actuated means to adjust the position of said valve, comprising means for varying said air pressure actuated by said member movable by said differential mechanism, having a bleed opening, and means for adjusting the effective size of said bleed opening, comprising a valve member, a lever engaging said valve member to hold said valve member in adjusted position, means for adjusting the relative spacing of the fulcrum of said lever and the point of engagement of said valve member with said lever, and means for adjusting the position of said lever actuated by the member movable in opposite directions.

LYNDUS E. HARPER.

REFERENCES CITED

The following references are of record in the file of this patent:

UNITED STATES PATENTS

| Number | Name | Date |
|---|---|---|
| 881,135 | Kirk | Mar. 10, 1908 |
| 1,200,324 | Earl et al. | Oct. 3, 1916 |
| 1,270,332 | Schaffer | June 25, 1918 |
| 1,753,662 | Merker | Apr. 8, 1930 |
| 1,763,335 | Watts | June 10, 1930 |
| 1,929,693 | Jones et al. | Oct. 10, 1933 |
| 1,961,350 | Grunsky | June 5, 1934 |
| 1,967,690 | Sherman | July 24, 1934 |
| 2,005,950 | Moroney et al. | June 25, 1935 |
| 2,038,667 | Neff | Apr. 28, 1936 |
| 2,072,442 | Collins | Mar. 2, 1937 |
| 2,102,584 | Brown | Dec. 21, 1937 |
| 2,206,237 | Roberts | July 2, 1940 |
| 2,211,753 | Leopold | Aug. 20, 1940 |
| 2,243,826 | Nielsen et al. | May 27, 1941 |
| 2,262,031 | Meyer | Nov. 11, 1941 |
| 2,428,100 | Soulen | Sept. 30, 1947 |